US012741691B2

(12) United States Patent
Ham

(10) Patent No.: US 12,741,691 B2
(45) Date of Patent: Sep. 22, 2026

(54) SYSTEM AND METHOD OF CORRECTING TORQUE OFFSET OF MOTOR FOR MOTOR-DRIVEN POWER STEERING SYSTEM

(71) Applicants: Hyundai Motor Company, Seoul (KR); Kia Corporation, Seoul (KR)

(72) Inventor: Seung Ju Ham, Suwon-si (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 1169 days.

(21) Appl. No.: 17/501,778

(22) Filed: Oct. 14, 2021

(65) Prior Publication Data

US 2022/0289273 A1 Sep. 15, 2022

(30) Foreign Application Priority Data

Mar. 11, 2021 (KR) ........................ 10-2021-0031894

(51) Int. Cl.

| | |
|---|---|
| ***B62D 5/04*** | (2006.01) |
| ***B62D 6/10*** | (2006.01) |
| ***B62D 15/02*** | (2006.01) |
| ***G07C 5/08*** | (2006.01) |

(52) U.S. Cl.

CPC ............. *B62D 5/0463* (2013.01); *B62D 6/10* (2013.01); *B62D 15/025* (2013.01); *G07C 5/0825* (2013.01)

(58) Field of Classification Search

CPC ...... B62D 5/0463; B62D 6/10; B62D 15/025; B62D 6/00; B62D 6/008; B62D 6/08; B62D 5/046; B62D 5/0484; G07C 5/0825; B60W 10/20; B60W 30/12; B60W 40/072;

(Continued)

(56) References Cited

U.S. PATENT DOCUMENTS

| | | | | |
|---|---|---|---|---|
| 2017/0036694 | A1* | 2/2017 | Okuda | B62D 6/02 |
| 2021/0371010 | A1* | 12/2021 | Kojo | B62D 15/025 |
| 2022/0063717 | A1* | 3/2022 | Kobayashi | B62D 5/0463 |

FOREIGN PATENT DOCUMENTS

| | | | |
|---|---|---|---|
| EP | 2905206 | A1 | 8/2015 |
| KR | 20110101599 | A | 9/2011 |
| KR | 2018-0069504 | A | 6/2018 |

(Continued)

*Primary Examiner* — Scott A Reinbold
(74) *Attorney, Agent, or Firm* — MORGAN, LEWIS & BOCKIUS LLP

(57) ABSTRACT

A method of correcting torque offset of a motor-driven power steering motor, may include activating a lane following assist (LFA) function by an LFA unit of a vehicle, acquiring a comparison range for determining whether the torque offset of the motor included in a motor-driven power steering (MDPS) unit of the vehicle is present under a predetermined comparison condition during a first travel of the vehicle, and determining a relationship coefficient based on a current required torque value required by the LFA unit and a current measured torque value of the motor, acquired by applying the current required torque value by the MDPS unit, and determining whether torque offset of the motor is present when the determined relationship coefficient is within the comparison range during a second travel performed after the first travel and performed in a lane having the same lane condition as the first travel.

5 Claims, 6 Drawing Sheets

(58) Field of Classification Search
CPC .......... B60W 50/08; B60W 2050/0049; B60K 35/00; B60K 35/22; B60Y 2300/12
USPC .......................................................... 701/23
See application file for complete search history.

(56) References Cited

FOREIGN PATENT DOCUMENTS

| | | | |
|---|---|---|---|
| KR | 20190051572 | A | 5/2019 |
| KR | 20200129339 | A | 11/2020 |

* cited by examiner

FIG. 2

SYSTEM AND METHOD OF CORRECTING TORQUE OFFSET OF MOTOR FOR MOTOR-DRIVEN POWER STEERING SYSTEM

CROSS-REFERENCE TO RELATED APPLICATION

The present application claims priority to Korean Patent Application No. 10-2021-0031894 filed on Mar. 11, 2021, the entire contents of which is incorporated herein for all purposes by this reference.

BACKGROUND OF THE INVENTION

Field of the Invention

The present invention relates to a system and method of correcting torque offset of a motor for an electric power steering system, and more particularly, to a system and method of correcting torque offset of an electric power steering motor for improving the hands-off detection capability of a lane following assist (LFA) function by determining and correcting the offset.

Description of Related Art

Recently, various vehicle driving assistance systems for preventing accidents and simultaneously improving safety have been introduced. The vehicle driving assistance systems may control a vehicle to autonomously determine some dangerous situations that occur and to avoid risk while driving.

Of the assistance systems, a lane following assist (LFA) system helps the vehicle drive while maintaining the vehicle along the center portion of a lane. By detecting a lane and a preceding vehicle through a front camera for imaging a front side of the vehicle, the LFA system controls steering of the vehicle. The LFA function may be activated through manipulation of a lane driving assistance button provided in a passenger compartment.

The LFA system controls a steering wheel in conjunction with a motor-driven power steering (MDPS) or electric power steering (EPS) system. As a type of steering assist booster, the MDPS system is one of power steering operation methods for assisting steering through an electric motor. LFA control is performed through cooperative control of the MDPS system and the front camera.

The LFA system includes a hands-off detection function. The hands-off detection function is configured to detect whether a driver drives a vehicle without gripping a steering wheel during activation of the LFA. The LFA may be activated by inputting an on-signal of the lane driving assistance button.

The LFA detects hands-off based on motor torque of the MDPS. When the measured motor torque value of the MDPS is maintained within a predetermined reference range for a predetermined time period, the current state is determined to be a hands-off state. When the measured motor torque value of the MDPS is outside the reference range, the current state is determined to be a hands-on state in which the driver grips a steering wheel.

Offsets may occur in the MDPS motor torque values due to mis-assembly of the steering wheel, etc. If the MDPS motor torque value is not zero when the steering wheel is not operated, i.e., there is an offset in the value, all measured torque values become larger or smaller by the offset. Accordingly, a hands-off state where the driver does not hold the steering wheel may be mistakenly determined as a hands-on state as the torque value falls outside the reference range due to such variations.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a system and method of correcting torque offset of a motor-driven power steering motor configured for determining whether an offset occurs in a motor torque value by statistically analyzing the characteristics of MDPS torque signals, correcting the offset, and detecting hands-off of a steering wheel based on the corrected torque value.

The objects of the present invention are not limited to the objects as mentioned above, and other unmentioned objects will be understood by those skilled in the art from the following description and will be more clearly appreciated by the exemplary embodiments of the present invention.

The present invention may have the following features for achieving the aforementioned objects and performing the following characteristic functions.

According to various exemplary embodiments of the present invention, a method of correcting torque offset of a motor-driven power steering motor includes activating a lane following assist (LFA) function by an LFA unit of a vehicle, acquiring a comparison range for determining whether the torque offset of the motor included in a motor-driven power steering (MDPS) unit of the vehicle is present under a predetermined comparison condition during a first travel of the vehicle, and determining a relationship coefficient based on a current required torque value required by the LFA unit and a current measured torque value of the motor, acquired by applying the current required torque value by the MDPS unit, and determining whether torque offset of the motor is present when the determined relationship coefficient is within the comparison range during a second travel performed after the first travel and performed in a lane having the same lane condition as the first travel.

According to various exemplary embodiments of the present invention, a torque offset correction system of a motor-driven power steering motor includes a motor-driven power steering (MDPS) unit including a motor configured to assist manipulation of a steering wheel of a vehicle, a lane following assist (LFA) unit configured to collect lane information from a preceding vehicle that travels ahead of the vehicle, a memory configured to store a comparison range for determining whether torque offset of the motor is present under a predetermined comparison condition, and a controller configured to communicate with the MDPS unit, the LFA unit, and the memory and to control the MDPS unit and the LFA unit, wherein the controller is configured to determine a current required torque value of the motor, required to maintain a lane, from the lane information collected by the LFA unit, to transmit the determined current required torque value to the MDPS unit, to receive a current measured torque value of the motor acquired by applying the current required torque value by the MDPS unit, to determine a relationship coefficient indicating a correlation between the current required torque value and the current measured torque value, and to determine whether the torque offset of the motor is present by comparing the relationship coefficient with the comparison range.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a diagram showing an example of a required torque signal of a motor required by a lane following assist (LFA) unit;

Figure 1:
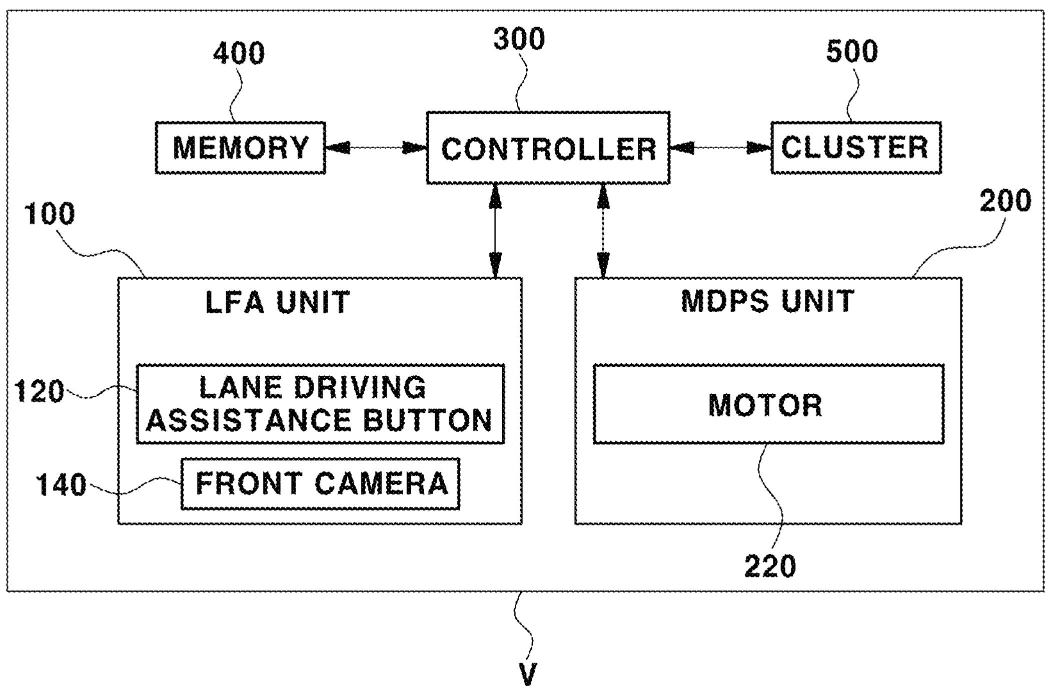
FIG. 1 is a diagram showing the configuration of a torque offset correction system of a motor-driven power steering motor according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it may be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for describing various exemplary embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in the exemplary embodiment, specify the presence of stated components, steps, operations, and/or elements, but do not preclude the presence or addition of one or more other components, steps, operations, and/or elements thereof As described above, an offset may occur in a motor torque value of a motor-driven power steering (MDPS) system due to some certain reasons, such as mis-assembly of a steering wheel, etc., but it is not easy to identify presence of the offset. Here, the offset indicates that a motor torque value is measured as a value which is not 0 even if a driver does not operate the steering wheel, or the offset refers to a difference between the measured value at the instant time and 0.

A lane following assist (LFA) function is operatively associated with a motor of the MDPS. The hands-off state where the driver does not grip the steering wheel while the LFA control is activated may be determined based on the measured torque value of the MDPS motor. That is, to detect whether the current state is a hands-off state, when the motor torque value measured in the MDPS motor is not within a predetermined reference range for a predetermined time period, the current state may be determined to be a hands-on state in which a driver grips the steering wheel. On the other hand, when the motor torque value is within the predetermined reference range, the current state may be determined to be a hands-off state.

When the offset is present in the measured motor torque value, hands-off detected in LFA control may not be accurate. For example, when positive (+) offset C1 is present, all the measured torques may increase by C1. Of the values increased by C1, there are some values that happen to fall outside the reference range, which would normally be within the reference range if no offset were present. This may cause an actual hands-off state to be mistakenly determined as a hands-on state.

Accordingly, various aspects of the present invention provide a method of correcting motor torque offset for determining whether an offset is present in MDPS motor torque, notifying a driver of occurrence of the offset and correcting the offset when the offset is present, and determining whether the current state is a hands-off state based on the corrected measured torque value.

Hereinafter, various exemplary embodiments of the present invention will be described in detail with reference to the accompanying drawings.

As shown in FIG. 1, a torque offset correction system of a motor-driven power steering motor according to various exemplary embodiments of the present invention may include a lane following assist (LFA) unit 100, a motor-driven power steering (MDPS) unit 200, a controller 300, and a memory 400.

The LFA unit 100 may control a vehicle V to travel while maintaining the vehicle along the center portion of a driving lane when the vehicle V travels on a road.

An operation of the LFA unit 100 may be activated or deactivated by a lane driving assistance button 120. According to various exemplary embodiments of the present invention, the lane driving assistance button 120 may be provided in a passenger compartment and may input an on-signal or an off-signal by manipulation thereof. For example, an LFA function may be activated by inputting an on-signal of the lane driving assistance button 120.

Figure 2:
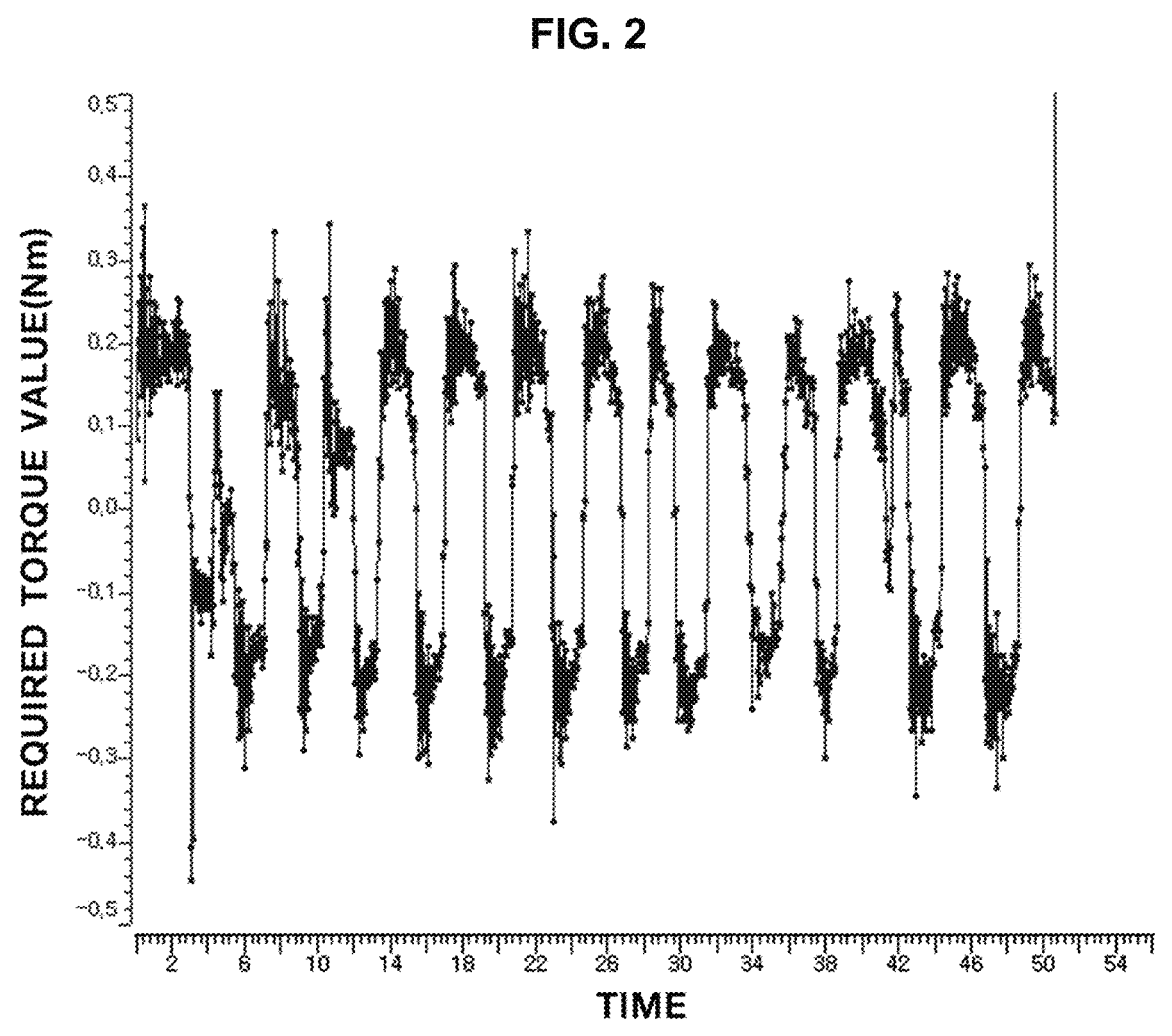

The LFA unit 100 may include a front camera 140 for LFA control. While the LFA is activated, the front camera 140 may recognize a lane and a preceding vehicle that travels ahead of the vehicle V on the road and may obtain lane information. The LFA unit 100 may acquire a required torque value that needs to be requested to a motor 220 of the MDPS and may transmit the acquired required torque value to the controller 300 to control steering based on the obtained lane information. An example of the required torque values (Newton·meter (N·m)) over time (seconds), acquired by the LFA unit 100, is shown in FIG. 2.

Figure 3:
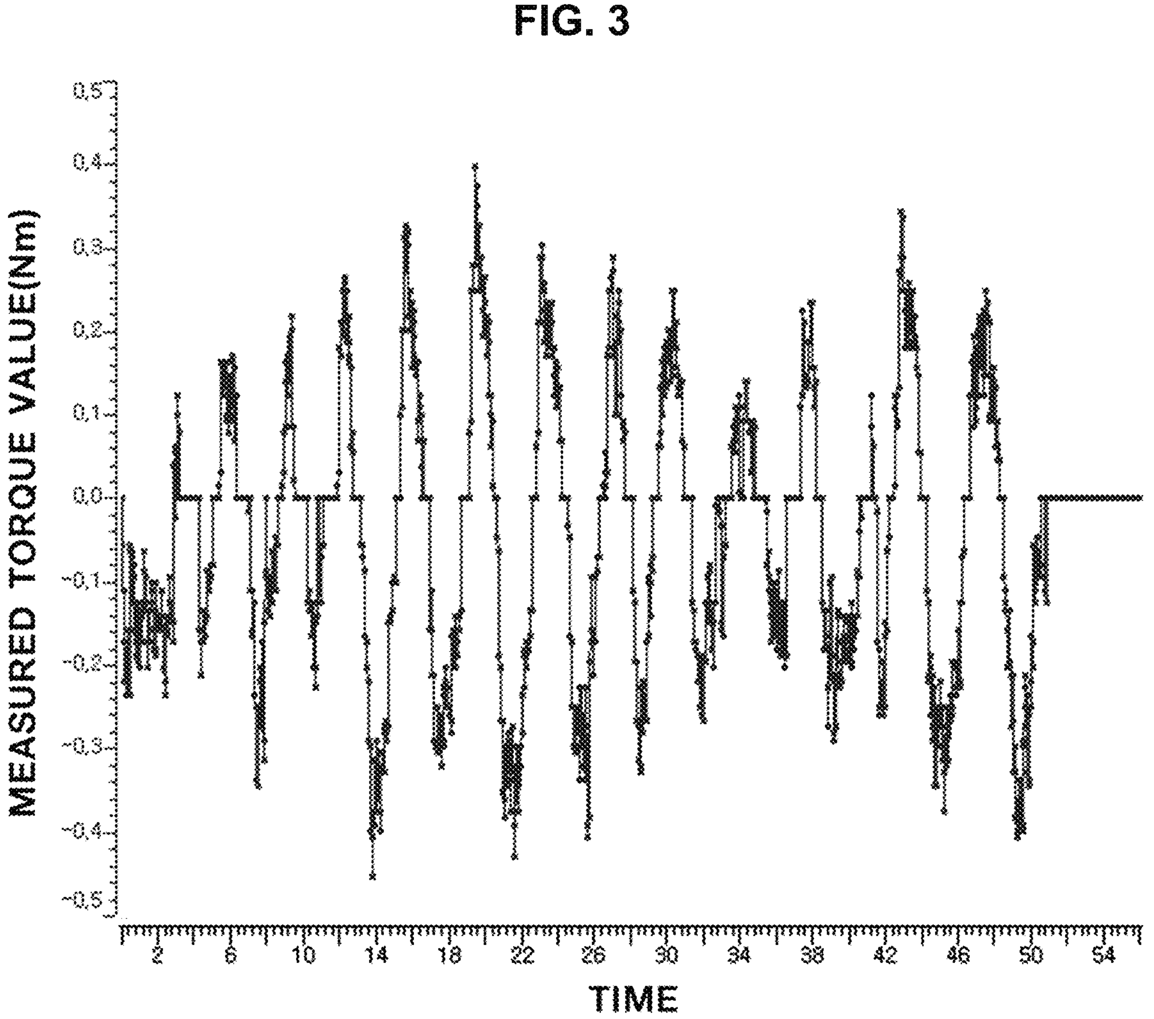
FIG. 3 is a diagram showing a measured torque signal of a motor-driven power steering (MDPS) unit motor measured by applying a required torque signal of an LFA unit.

The MDPS unit 200 may include the motor 220 and may drive the motor 220 to assist steering of the vehicle V. The MDPS unit 200 may drive the motor 220 in a response to the steering intention of the driver such that the driver easily handles the steering wheel. A torque sensor included in the MDPS unit 200 may detect steering torque of the driver. Then the motor is driven at an auxiliary torque determined based on the detected steering torque such that auxiliary power is provided during steering. The MDPS unit 200 may be configured to transfer a measured torque value of the motor 220, measured in real time, to the controller 300. An example of measured torque values (N·m) being a torque signal, measured by the MDPS unit 200 over time (seconds), is shown in FIG. 3.

The controller 300 may transfer the required torque value requested from the LFA unit 100 to the MDPS unit 200. The MDPS unit 200 may drive the motor 220 to follow the received required torque value, and a measured torque value of the motor 220 which is measured during the present time may be transmitted to the controller 300 from the MDPS unit 200.

The controller 300 may determine whether the driver grips the steering wheel based on the measured torque value transmitted from the MDPS unit 200. The state in which the driver grips the steering wheel may be determined to be a hands-on state, whereas the state in which the steering wheel is not gripped by the driver may be determined to be a hands-off state.

Figure 4:
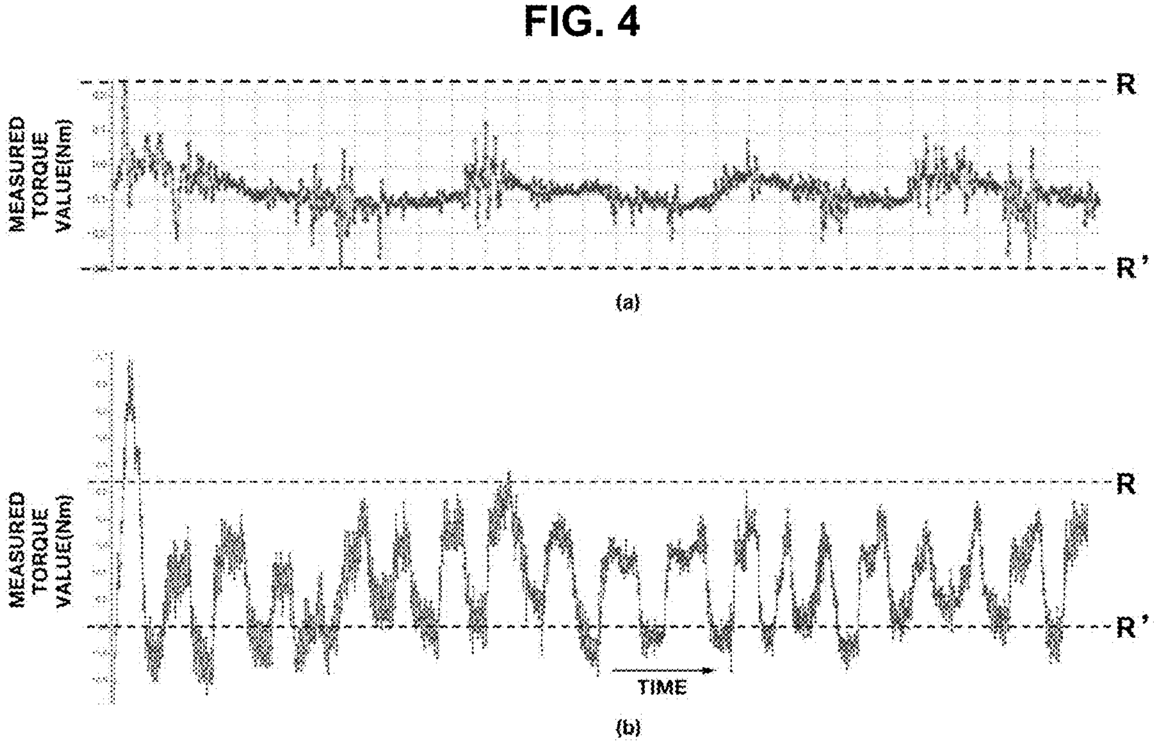
FIG. 4 shows a graph of a measured torque value of a motor in a hands-off state during LFA control at the top and a graph of a measured torque value of a motor in a hands-on state at the bottom.

As shown in FIG. 4, when the measured torque value of the motor 220 is positioned within a reference range R-R' indicated by a dotted line for a preset predetermined time period, the controller 300 may determine the current state to be a hands-off state (an upper graph of FIG. 4). However, when the measured torque value of the motor 220 is not positioned within the reference range R-R' for a predetermined time period, the controller 300 may determine the current state to be a hands-on state (a lower graph of FIG. 4). Here, the reference range R-R' may be a tuning factor determined during design of each vehicle and may differ depending on the state of the vehicle. When the same required torque value is requested for a hands-on state and a hands-off state, change in the measured torque value would be large in the hands-on state. Thus, the controller 300 may determine whether the current state is a hands-on state or a hands-off state based on the received measured torque value.

Figure 5:
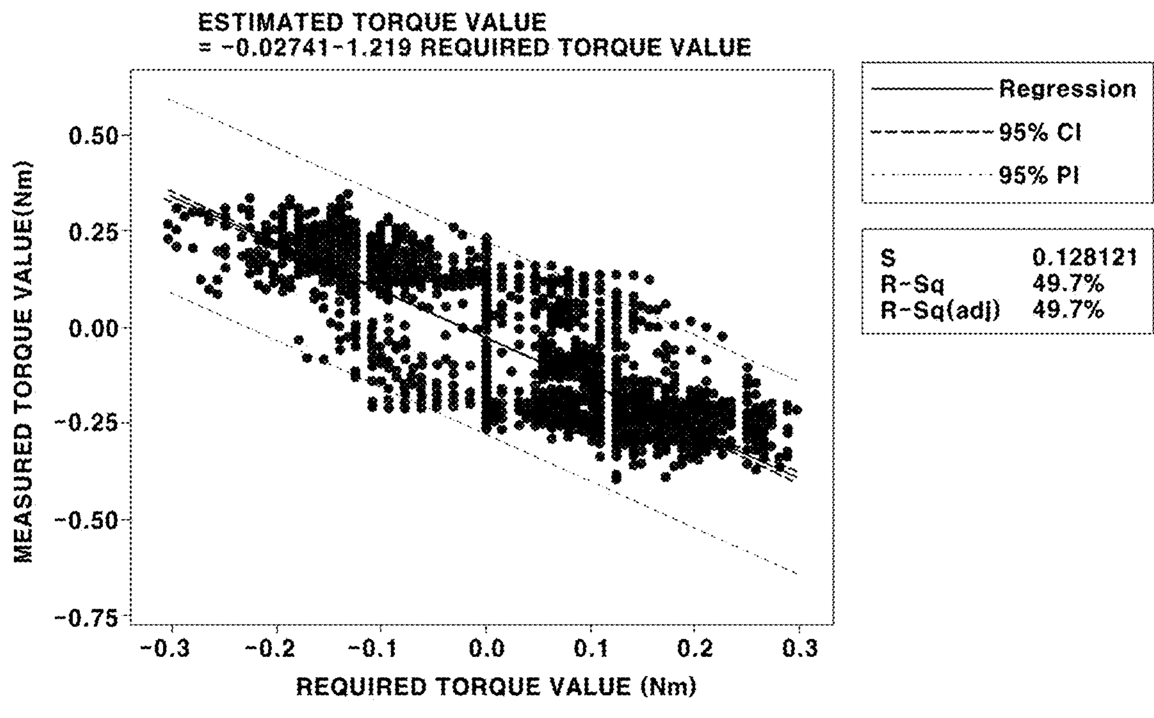
FIG. 5 is a graph showing a regression analysis result obtained by plotting a measured torque value with respect to a required torque value during LFA control.

According to various exemplary embodiments of the present invention, a graph shown in FIG. 5 may be obtained as a result of plotting the required torque value on the x-axis and the measured torque value on the y-axis. It may be seen that a linear relationship (slope: −1.219, intercept: −0.2741) is established between the required torque value and the measured torque value, and there is a correlation as a result of statistical correlation analysis. In the drawing, lines indicating a regression, a confidence interval of 95%, and a predictive interval of 95% are represented. S refers to a standard error of the regression, R-Sq refers to a coefficient of determination, and R-Sq(adj) refers to a coefficient of determination after adjustment.

The memory 400 may store a comparison condition for checking whether the torque offset of the motor 220 of the MDPS is present. According to various exemplary embodiments of the present invention, the memory 400 may be a non-volatile memory storing data and may be a memory included in a microcontroller unit of the vehicle.

According to various exemplary embodiments of the present invention, the comparison condition may be provided. The comparison condition may be a determinant for checking whether the torque offset of the motor 220 of the MDPS is present. That is, whether all motor torque values are increased or decreased should be checked. The increase or decrease in the torque values may be caused by a motor torque value which is measured when the steering wheel is not operated but an offset is present in the measured torque value. To the present end, according to various exemplary embodiments of the present invention, selected as the comparison condition is a value with small variations depending on situations and obtained only in a particular situation at the same time.

According to various exemplary embodiments of the present invention, as the value having small variations depending on situations, the measured torque value of the motor in the hands-off state in which the driver does not grip the steering wheel is selected. When the driver is holding the steering wheel, variations in the measured torque value depending on the required torque value for following the center portion of a lane may be large. That is, the measured torque value may greatly change depending on how the driver grips the steering wheel and with how much force the driver grips the steering wheel. Thus, according to various exemplary embodiments of the present invention, the measured torque value in the hands-off state is selected as the value with small variations depending on situations.

In the latter case, the measured torque value of the motor in a lane having a certain curvature or greater is selected to obtain a value derived only in a specific situation. In a straight lane, the steering wheel is less manipulated. Even if driver grips the steering wheel while the vehicle is moving in the straight lane, the difference between the measured torque value of the motor in the hands-off state and the measured torque value of the motor in the hands-on state may be small. Thus, because the present situation may be misrecognized as torque offset abnormality, according to various exemplary embodiments of the present invention, a measured torque value at a certain curvature or greater may be used as a reference.

Consequently, according to various exemplary embodiments of the present invention, a measured torque value of a motor while a vehicle travels in the hands-off state and in a lane having a curvature $C_1$ or greater may be set to the comparison condition to determine torque offset abnormality. Here, selected is a curvature at which the measured torque value may be clearly distinguished from the measured torque value in the hands-off state even though the driver is holding the steering wheel while driving. This particular curvature may be obtained during development or testing of the vehicle and selected as the curvature $C_1$.

When the vehicle is developed and tested, a relational function between the required torque value and the measured torque value of the motor 220 may be determined. The relational function may be obtained by performing statistical regression analysis on the required torque value of the motor and the measured torque value in the hands-off state during LFA control in a lane with the curvature $C_1$ or greater. Here, the MDPS unit 200 measures the measured torque value and the required torque value of the motor is transmitted to the MDPS unit 200 from the front camera 140 or the LAF unit 100.

The relational function between the required torque value and the measured torque value of the motor 220 may be determined by plotting the measured torque value measured by the MDPS unit 200 and the required torque value acquired by the LFA unit 100 in the hands-off state and in the lane having the curvature $C_1$ and by deriving a slope and an intercept of the relational function via linear regression analysis. For example, in case of the measured torque value ($\tau_{m,ho,C1}$) and the required torque value ($\tau_{r,ho,C1}$) in the hands-off state ho and in the lane having the curvature $C_1$, a slope $m_1$ and an intercept $n_1$ may be obtained using Equation 1 below.

$$\tau_{m,ho,c_1} = m_1 \tau_{r,ho,c_1} + n_1 \quad \text{[Equation 1]}$$

Then the required torque value and the measured torque value obtained from a vehicle that travels in the hands-off state and in a lane having $C_2$ greater than the curvature $C_1$ may be acquired. The $m_2$ and $n_2$ may be determined in the same manner as in Equation 1. Slopes and intercept values, corresponding to each curvature, may be determined by repeating the above procedure in the hands-off state and in a lane having a curvature of $C_2$, $C_3$, $C_4$, . . . , and $C_x$. Here, the curvature increases as a value of a subscript of C increases. Equation 2 below may be determined by re-writing Equation 1 as a generalized equation for each curvature.

$$\tau_{m,ho,c_x} = m_x \tau_{r,ho,c_x} + n_x \quad \text{[Equation 2]}$$

Here, x is a positive number equal to or greater than 1.

According to various exemplary embodiments of the present invention, the relational function may be determined through linear regression analysis of the measured torque value and the required torque value of the motor 220, measured during LFA control in a hands-touch state and in the lane having the curvature $C_1$, may be determined when the vehicle is developed and tested. Throughout the present specification, the hands-touch state refers to the state in which the driver does not apply force to the steering wheel with his or her hand placed on the steering wheel and also refers to the state where a preset minimum external force is applied to the steering wheel.

For example, a slope $p_1$ and an intercept $q_1$ may be obtained as shown in Equation 3 below by plotting the measured torque value ($\tau_{m,ht,C1}$) and the required torque value ($\tau_{r,ht,C1}$) that are acquired in the hands-touch state ht and in the lane having the curvature $C_1$ and then performing linear regression analysis.

$$\tau_{m,ht,c_1} = p_1 \cdot \tau_{r,ht,c_1} + q_1 \quad \text{[Equation 3]}$$

Like in the aforementioned hands-off state, slopes and intercepts corresponding to each curvature may be obtained by plotting the measured torque value and the required torque value of the vehicle that travels in the hands-touch state and in the lane having a curvature of $C_2$, $C_3$, $C_4$, . . . , $C_x$ greater than the curvature $C_1$.

That is, a slope $p_x$ and an intercept $q_x$ may be obtained by plotting the required torque value and the measured torque value of the motor 220 in the hands-touch state and a lane having a curvature $C_x$ (x=1, 2, 3, . . . ) during LFA control and performing regression analysis. That is, Equation 3 may be expanded to Equation 4 below for each curvature.

$$\tau_{m,ht,c_x} = p_x \cdot \tau_{r,ht,c_x} + q_x \quad \text{[Equation 4]}$$

According to various exemplary embodiments of the present invention, an intercept value has a small effect, and thus, only a slope multiplied by the required torque value may be taken into consideration.

Since a change rate in the measured torque value with respect to the required torque value in the hands-on state is greater than in the hands-off state, a relationship in Equation 5 may be established between $m_x$ and $p_x$ for each curvature $C_x$.

$$|m_x| < |p_x| \quad \text{[Equation 5]}$$

Here, it is likely that a coefficient whose absolute value is greater than $p_x$ suggests a hands-on state, so a range of comparison where torque offset at curvature $C_x$ is determined to be abnormal may be $|m_x|$ to $|p_x|$.

The slope $m_x$ and the slope $p_x$ obtained through the series of procedures above may be stored in the memory 400 for each corresponding curvature.

Based on the stored information, whether motor torque offset is present while a vehicle travels may be determined. In detail, slopes of linear functions are obtained through statistical regression between the measured torque value measured by MDPS and the require torque values of the motor 220 by the front camera 140, checked during LFA control at curvature C1 or greater. Of the slopes, an absolute value of the slope multiplied with the required torque value is compared with $m_x$ and $p_x$, determined at the time of the vehicle development test. If the absolute value is within a range of $|m_x|$ to $|p_x|$, the torque offset is determined to be abnormal.

Whether the torque offset is present in a vehicle that actually travels may be determined through the following operations. Here, the actual travel refers to a situation in which a vehicle generally travels on a road after being developed and tested, and the term "actual travel" is distinguishably used from the aforementioned test travel.

Figure 6:
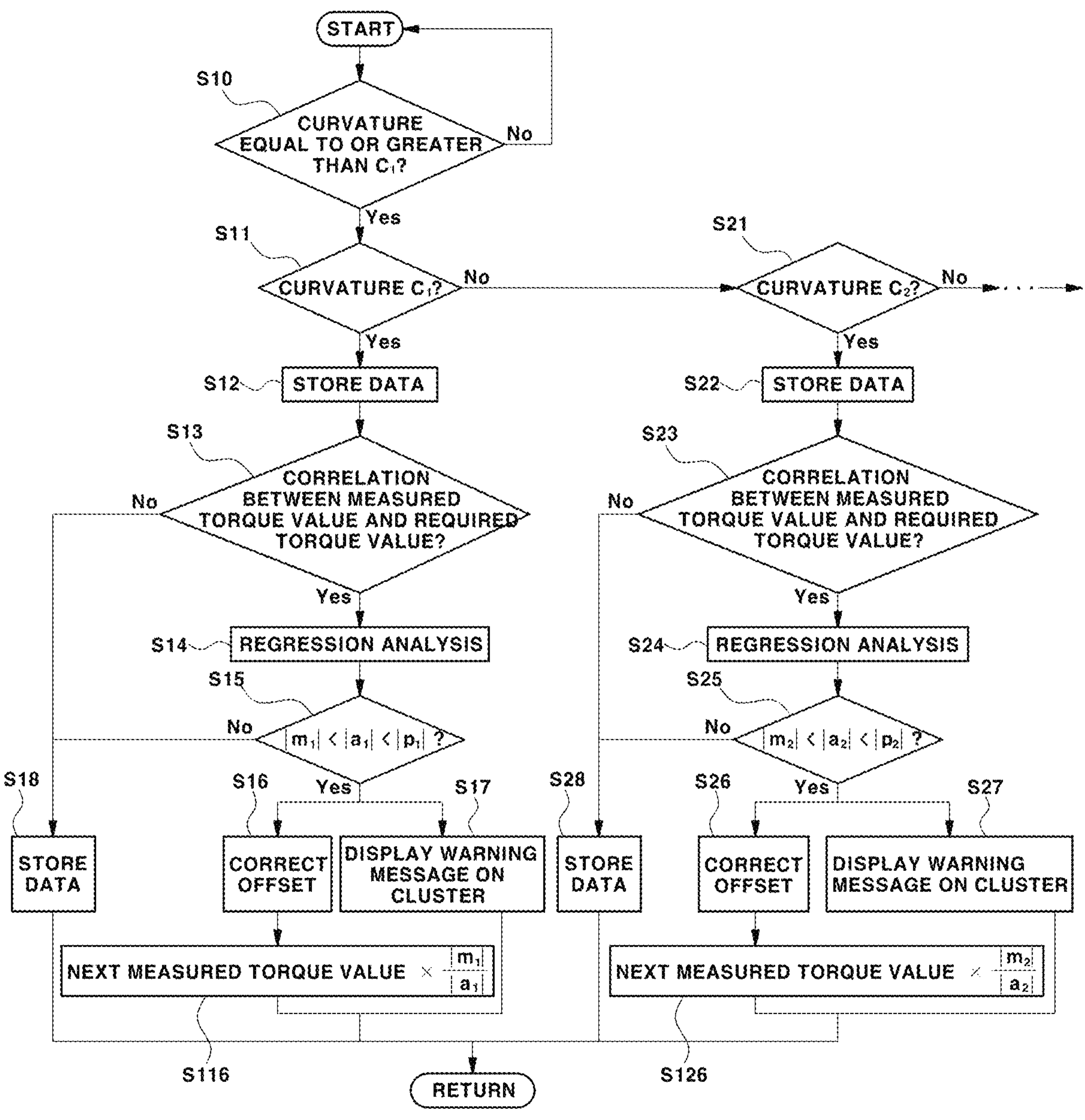
FIG. 6 is a flowchart of a torque offset correction method of a motor-driven power steering motor according to various exemplary embodiments of the present invention.

Referring to FIG. 6, whether the current driving road has a curvature equal to or greater than the curvature $C_1$ may be determined while LFA is activated during an actual travel (S10). The curvature of the road may be determined by the front camera 140. The front camera 140 may recognize a degree of the road curve by lane recognition, and a curvature of the road may be determined.

When the current driving road has the curvature equal to or greater than $C_1$, if the curvature of the current driving road is $C_1$, the method may proceed to operation S11. If the curvature of the current driving road is $C_2$, the method may proceed to operation S21. As indicated by dots in the drawings, when the curvature of the current driving road is $C_2$, $C_3$, . . . , the method may include each operation like in the curvatures $C_1$ and $C_2$. Hereinafter, an example of the case of the curvature $C_1$ will be described.

When the curvature of the current driving road is $C_1$ (S11), the required torque value of the LFA unit 100 and the measured torque value of the MDPS unit 200, measured in the instant case, may be stored in the memory 400 (S12). Similarly, the required torque value of the LFA unit 100 and the measured torque value of the MDPS unit 200 at each curvature $C_x$ may each be stored in the memory 400. A memory address for the required torque value and the measured torque value may be differently determined for each curvature $C_x$, and the required torque value and the measured torque value may be distinguishably stored in the memory 400.

Simultaneously, the controller 300 may determine whether there is a correlation between the required torque value and the measured torque value at curvature $C_1$ by continuously performing statistical correlation analysis (S13).

When it is determined that there is a correlation between the required torque value ($\tau_{r,C1}$) and the measured torque value, a relational function shown in Equation 6 below may be derived through regression analysis (S14). When a relationship coefficient $a_1$ multiplied with the required torque value ($\tau_{r,C1}$) is checked and an absolute value of the relationship coefficient $a_1$ is within a range of $|m_1|$ to $|p_1|$, the torque offset may be determined to be present (S15).

$$\tau_{m,C1} = a_1 \cdot \tau_{r,C1} \qquad \text{[Equation 6]}$$

According to various exemplary embodiments of the present invention, when the torque offset is determined to be present, correction may be performed to remove the offset (S16). Simultaneously, a message indicating that offset correction is required may be displayed on a cluster 500 to allow the driver to recognize the message (S17).

Then in case of the curvature $C_1$, the torque offset may be corrected by acquiring a correction constant by dividing the slope $m_1$ by the relationship coefficient $a_1$. From then on, each measured torque value input is multiplied by the correction constant to correct the torque offset (S116). For example, in case of the curvature $C_1$, when a comparison range $|m_1|<|a_1|<|p_1|$ is satisfied, the offset may be corrected by multiplying $$\frac{|m_1|}{|a_1|}$$

which is a correction constant in the lane having the curvature $C_1$ by the measured torque value input thereafter.

When the offset is corrected, whether the current state is a hands-off state may be determined based on a more accurate measured torque value.

Similarly, in case of actual travel in the lane having the curvature $C_2$, whether the torque offset of the motor is present may be determined by performing operations S21 to S126. In case of lanes having a curvature $C_3$ or greater, each operation may be performed in the same manner.

According to various exemplary embodiments of the present invention, the hands-off detection capability of the LFA may be improved with low cost. For offset detection and correction, it may not be required to additionally install hardware compared with an existing system, and it may be possible to detect and correct torque offset by adding minimal software.

According to various exemplary embodiments of the present invention, the reliability of vehicle customers may be improved. The present invention may improve reliability by transmitting accurate information such as hands-off to a customer.

According to various exemplary embodiments of the present invention, a vehicle may be safely driven by allowing the driver to recognize torque offset and to repair defects.

According to various exemplary embodiments of the present invention, the possibility of violations of regulations required by law may be reduced by accurately making hands-off warnings.

The present invention may provide a system and method of correcting torque offset of a motor-driven power steering motor configured for determining whether offset occurs in a motor torque value by statistically analyzing the characteristics of MDPS torque signals, correcting the offset, and detecting hands-off based on the corrected torque value.

It will be appreciated by persons skilled in the art that the effects capable of being achieved through the present invention are not limited to what has been described hereinabove, and other advantages of the present invention Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a vehicle, the method comprising:

determining a first set of measured torques of a steering motor of the vehicle driving on a lane having a first curvature, wherein the steering motor is configured to assist rotation of a steering wheel in the vehicle;

determining a first set of required torques required for the steering motor such that the vehicle driving on the lane having the first curvature is driven within the lane;

determining a first coefficient associating the first set of measured torques with the first set of required torques based on the determined first set of measured torques and the determined first set of required torques;

determining whether a torque offset of the steering motor is present based on the first coefficient being within a preset coefficient range; and driving the steering motor after correcting the torque offset of the steering motor based on the first coefficient and the preset coefficient range, wherein the coefficient range is determined based on a first plurality of measured torque values of the steering motor measured when the vehicle is driving on a lane of each curvature in a plurality of curvatures under a first condition and a first plurality of demand torque values required to the steering motor to maintain the vehicle within the lane of each curvature.

2. The method of claim 1, wherein the first condition is a condition in which the vehicle travels in a hands-off state.

3. The method of claim 1, wherein the coefficient range is determined based on a second plurality of measured torque values of the steering motor measured when the vehicle is driving on the lane of each curvature in the plurality of curvatures under a second condition and a second plurality of measured demand torque values required the steering motor to maintain the vehicle within the lane of each curvature.

4. The method of claim 3, wherein the second condition is a condition in which the vehicle travels in a hands-on state.

5. The method of claim 4, further comprising:

determining a torque applied with a correction constant preset by the steering motor based on the first coefficient being outside the preset coefficient range.

* * * * *